Oct. 11, 1966  F. J. CALLAHAN, JR., ETAL  3,278,156
BELLOWS VALVE
Filed Dec. 27, 1965  3 Sheets-Sheet 1
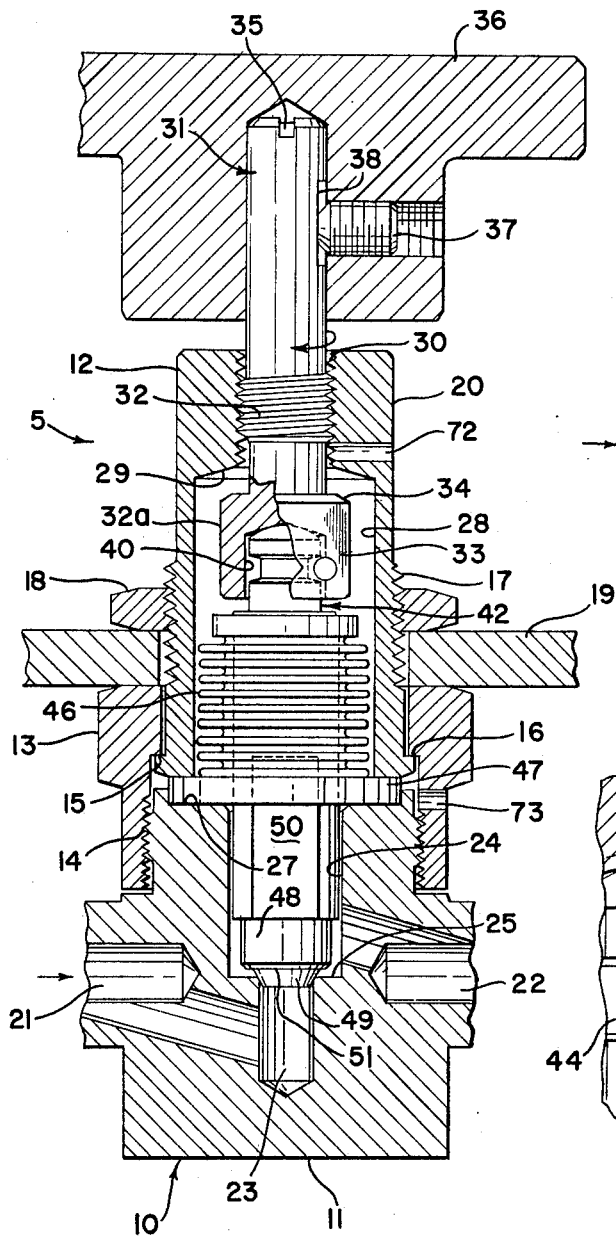
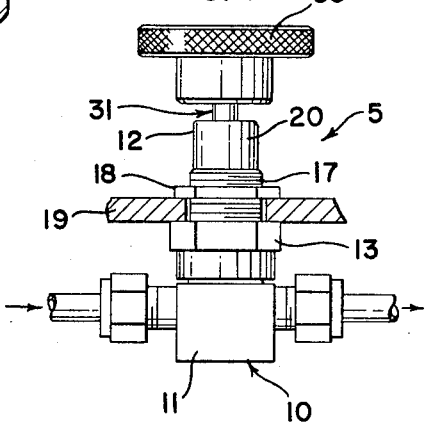
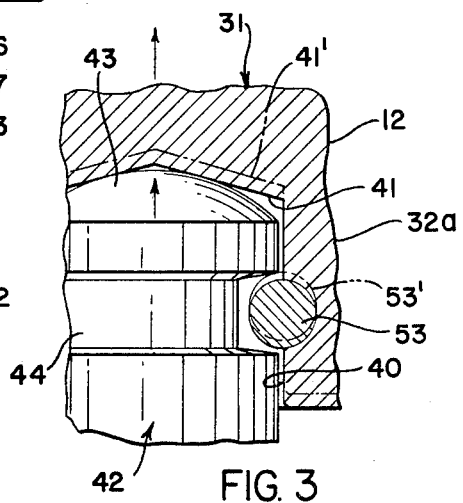
INVENTORS.
FRANCIS J. CALLAHAN, JR. &
BERNARD J. GALLAGHER
BY
*Fay & Fay*
ATTORNEYS Oct. 11, 1966     F. J. CALLAHAN, JR., ETAL     3,278,156
BELLOWS VALVE
Filed Dec. 27, 1965     3 Sheets-Sheet 2
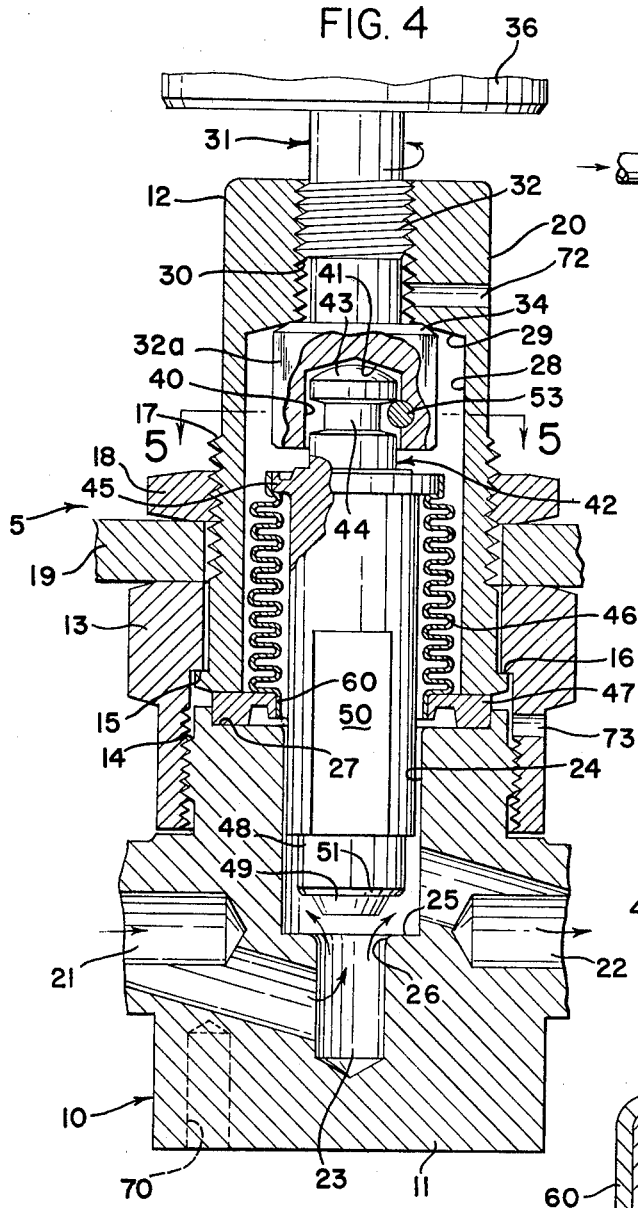
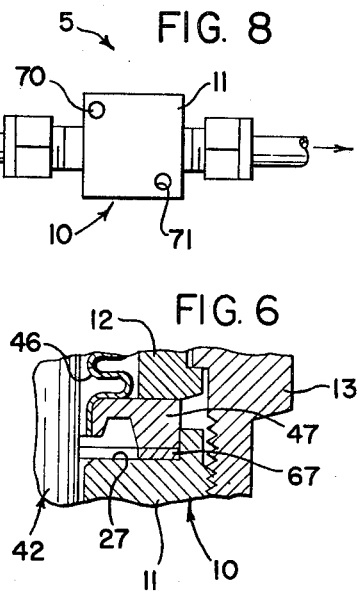
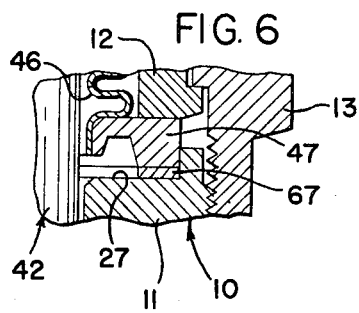
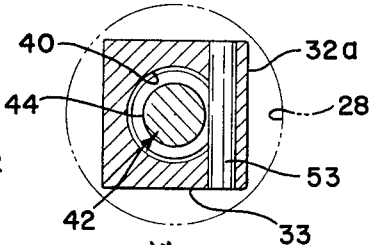
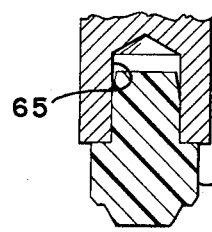
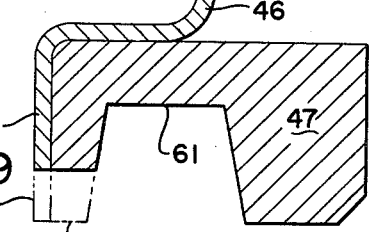
INVENTORS.
FRANCIS J. CALLAHAN, JR.
& BERNARD J. GALLAGHER
BY
*Fay & Fay*
ATTORNEYS Oct. 11, 1966    F. J. CALLAHAN, JR., ET AL    3,278,156
BELLOWS VALVE
Filed Dec. 27, 1965                                  3 Sheets-Sheet 3
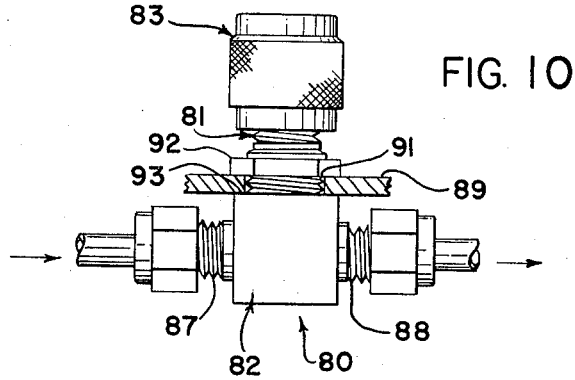
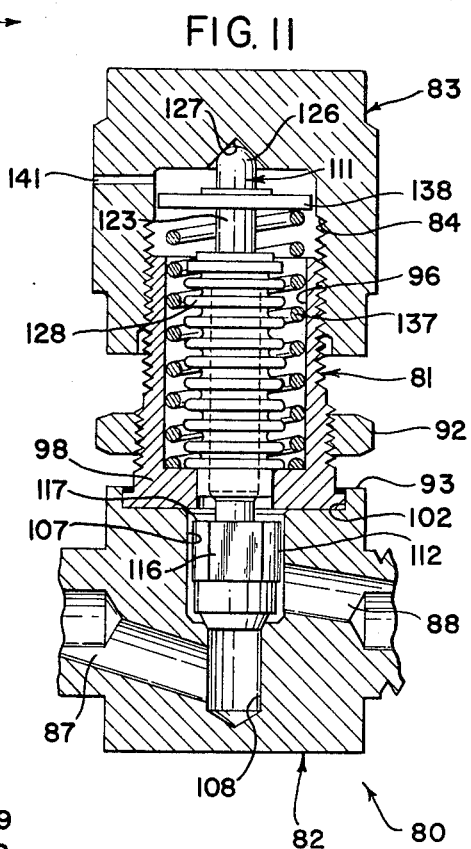
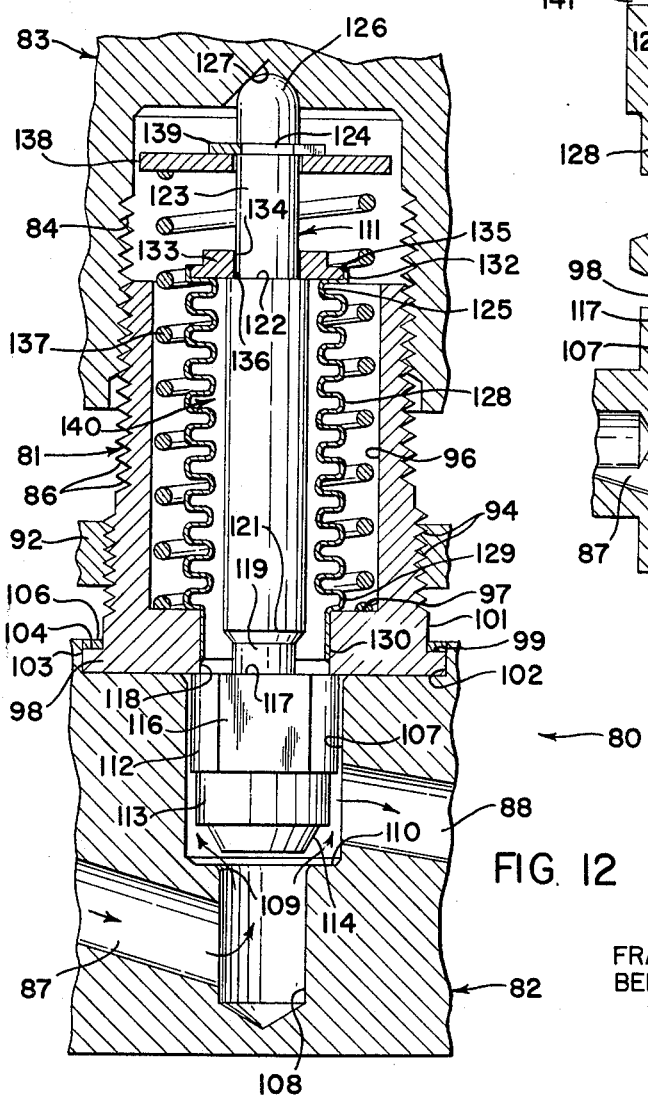
INVENTORS.
FRANCIS J. CALLAHAN, JR. &
BERNARD J. GALLAGHER
BY    *Fay & Fay*
ATTORNEYS

3,278,156
BELLOWS VALVE

Francis J. Callahan, Jr., Chagrin Falls, and Bernard J. Gallagher, Cleveland, Ohio, assignors to Nuclear Products Company, Cleveland, Ohio, a corporation of Ohio
Filed Dec. 27, 1965, Ser. No. 516,511
15 Claims. (Cl. 251—335)

This is a continuation-in-part of application Serial No. 267,699, filed March 25, 1963, and a continuation-in-part of application Serial No. 280,338, filed May 14, 1963; however, all of the material in the present application is disclosed in at least one of the above applications.

The present invention is directed, broadly, to valving devices, and more particularly to devices of the type commonly known as bellows valves.

Characterized by a bellows component serving to seal off the interior of the valve from the atmosphere, and at the same time to accommodate movements of the valve stem during the operating cycle, such valves have found increasingly wide acceptance. In principle the bellows valve concept presents notable advantages in so-called "closed system" applications involving the handling of corrosive and/or hazardous fluids at high temperatures and pressures. However, known prior art bellows type valves have often failed, for one reason or another, to meet the rising standards imposed by increasingly sophisticated systems.

Problems have arisen frequently in the case of prior bellows valve arrangements. Difficulties have been encountered, for example in obtaining that degree of design miniaturization which is desirable for present day instrumentation and processing applications. Undesirable transmission or torque to the bellows assembly during opening and closing presents an important barrier which has not heretofore been surmounted in a completely satisfactory manner. In addition to these, numerous other perplexities have been encountered through the whole spectrum of operation, manufacturing, assembly and design considerations.

The inventive principles incorporated in the present design are gauged to overcome many of these obstacles, and thus make it possible, for example, to provide for overall valve miniaturization without sacrifice of satisfactory high pressure and temperature capabilities. Suitable means is provided to minimize transmission of torque to the bellows, and at the same time, to preserve good overall design. The valve stem is accurately positioned at its upper end and guided closely adjacent the valve seat to insure proper alignment in seating, and to prevent undesirable chattering when subject to turbulent flow conditions. The present valve is so constructed as to enable manufacturing and assembly steps to be accomplished with ease, and yet produce a high quality product, encompassing all the attributes necessary to meet the exacting requirements of modern process and instrumentation systems.

A significant consideration involves the construction of the body components, which permits them to be manufactured from conventional stock materials, such as bar stock, or the like. Beneficial results arise from this construction in marked contrast with the integral casting arrangement which was prevalent in the prior art.

A special two-part body construction enables the seating portion of the stem to be maintained at a maximum dimension without requiring an increase in the size of the bellows. A seat of increased size permits full flow upon small linear travel of the valve stem. Thus, the total bellows expansion required to accommodate such linear motion is very small contrasted with embodiments which utilize, in comparison, a small seat and longer stroke. Resulting reduction in the axial bellows length not only diminishes the internal volume of the valve, but permits an overall miniaturization of the assembly.

The two-part body construction also allows the bellows to be placed in the assembly with the lowermost portion attached to the body and the upper portion attached to the stem. The connection of the bellows to the respective parts is effected before assembly, allowing for greater control of the operation. Additional beneficial results are obtainable with the versatile design of the valve. The ease of manufacture is enhanced by the construction shown as well as permitting, at assembly, a wide choice of valves for a wide range of temperature applications. In the lower ranges, non-metal and diverse metal seats and gaskets may be used to great advantage to obtain optimum operation results, as well as facilitating replacement of the seat when necessary. In higher temperatures, it is desirable to have an all metal construction, and here again, the design enables assembly of such with only minor changes in component parts.

In one aspect of the present invention a novel actuating means is provided to enable the valve to be self-opening under the natural expansive influence of the bellows. Accordingly, when the actuator is moved from a closed to an open position, the valve opens of its own accord, restrained only by light pressure on the end portion. Suitable means is provided to exert positive opening pressure on the stem in the event the inherent resiliency of the bellows and the opening force generated by fluid pressure should prove insufficient to move the valve components to full flow position. The means provided includes a multi-part stem interconnected by a novel pin and groove arrangement so constructed as to minimize any torsional load which ultimately may be imposed upon the bellows. The connection is located at the point on the stem of relatively small radial dimension (compared to the remainder of the stem) so that otherwise slight torsional forces will not be magnified by a lever arm effect to impose an injurious amount of torque on the bellows in the event the self-opening of the valve does not occur. The actuator is provided with suitable means to cooperate with a shoulder on the valve bonnet thus to provide a stop for limiting the extension of the bellows. This arrangement provides a back-seating feature as well, which protects against leakage in the event the bellows should rupture.

In a second embodiment of the present invention suitable means such as a compression spring is provided which constantly tends to urge the stem to the open position. Cap means rotatably abuts the free end of the stem to resist the force of the spring. The cap means is threadedly interfitted with the bonnet portion so that rotation of the cap in a clockwise direction closes the valve, while counterclockwise rotation allows the spring means and the line pressure to open the valve. Use of a cap material with a suitably low friction coefficient will result in transmission of very low amounts of torque to the stem during the operating cycle of the valve.

In one embodiment of the present invention considerable difficulty is encountered in connecting the lower portion of the bellows to the body of the valve. Attempts to solve this problem have resulted in solutions of a questionable nature. Often, a ring was fastened to the bellows prior to assembly and subsequently the ring was clamped in the valve body. The low mass of the ring frequently did not adequately dissipate the heat produced in the connecting operation. Such heat would oftentimes cause the annealing temperatures of the bellows to be exceeded, which resulted in reduction of flexure fatigue or in case hardening of the bellows adjacent the joint. Still further difficulty was experienced in providing a fluidtight assembly capable of handling corrosive fluids over a wide range of temperatures. In an effort to prevent annealing of the bellows in the soldering operation, manufacturers have resorted to using low temperature solders such as tin and lead. This solved the annealing problem; however, low temperature solders have a tendency to lose strength under load. The strength can be increased by adding nickel or cesium, but the maximum strength falls short of that desirable for the wide range of applications for bellows valves.

In the instant disclosure it will become apparent that silver solders with a melting temperature of 1145° F. have been employed to facilitate a high strength in joint between the bellows and stem and the bellows and the body. The use of a preformed solder ring having substantially thermal mass at the joint, and induction soldering techniques have served to keep the heat localized without detrimental effect on the fragile components.

In one embodiment, the assembly of the bonnet to the body has been accomplished by a combination of a mechanical and low heat solder joint which precludes overheating on assembly, yet providing a high strength fluid type connection which is most desirable.

It is the general object of this invention to provide a new and improved bellows valve.

It is a further object of this invention to provide a bellows valve employing a unique design gauged to facilitate economical manufacture, assembly and repair.

It is a further object of this invention to provide a self-opening bellows valve with provisions for positive stem return and for positive means to open the valve in the event self-opening is not accomplished.

It is a further object of this invention to provide a bellows valve embodying a unique connection between the actuator and stem to convert rotary and axial travel to pure linear motion with a minimum amount of torque transmission therebetween.

It is a further object of this invention to provide a bellows valve wherein all the component parts may be formed of stainless steel, brass or the like, thereby accommodating extreme pressures and temperatures.

It is a still futher object of this invention to provide a bellows valve having a novel means for fastening the bellows to the stem and body portions.

It is a still further object of this invention to provide a bellows valve having a removable seat portion.

It is a further object of this invention to provide a bellows valve which, due to its two part body construction, requires slight linear stem travel to accomplish full flow and which may be made from conventional stock material.

It is yet another object of this invention to provide a novel valve wherein the stem will be accurately guided at its upper and lower ends to insure proper stem travel in seating.

It is another object of this invention to provide a bellows valve wherein the materials for the parts thereof are chosen so that it be galvanically compatible.

Further and fuller objects will become readily apparent upon reference to the drawings wherein like reference numerals indicate like parts in the various views.

FIG. 1 is a view in elevation of one embodiment of the valve with fragmentary portions of the inlet and outlet lines shown, along with cross-sectional fragmentation portions of the bulk head to which it is mounted;

FIG. 2 is an enlarged elevation view of the valve of FIG. 1 with parts in section to illustrate the details of the valve;

FIG. 3 is a further enlarged fragmentary view of the connection between the actuator and the stem of the valve of FIG. 1;

FIG. 4 is a view similar to FIG. 1 with the valve in the open position;

FIG. 5 is a view taken along line 5—5 of FIG. 4;

FIG. 6 is an enlarged fragmentary view of a modified form of attaching the lower end of the bellows;

FIG. 7 is a fragmentary view of the lower portion of the stem showing a modified form of removable seat;

FIG. 8 is a bottom view on a reduced scale of the valve of FIG. 1;

FIG. 9 is a fragmentary enlarged cross-sectional view of the connection of the lower end of a bellows to a ring;

FIG. 10 is a side elevational view of a second embodiment of the valve mounted in a fragmentary portion of the bulk head shown in cross section;

FIG. 11 is an enlarged cross-sectional view of the valve in FIG. 10 with fragmentary portions of the inlet and outlet shown; and FIG. 12 is a further enlarged view similar to FIG. 11 with fragmentary portions of the cap, mounting nut, and body broken away for clarity.

Referring now to FIGS. 1 and 2, the valve 5 includes a body 10 consisting of a base portion 11 and a bonnet portion 12. A bonnet nut 13 joins the bonnet 12 by the interfitting threads indicated at 14.

The bonnet nut 13 has a flanged portion 15 which engages a flange 16 thus to hold the bonnet 12 in place when the parts are joined together. Bonnet 12 is externally threaded as at 17 to receive a mounting nut 18 to adapt the assembly for panel mounting. Accordingly, panel 19 may be clamped between opposed surfaces of bonnet nut 13 and mounting nut 18 when it is desired to so mount the valve. A cylindrical portion 20 of reduced diameter is provided on the exterior of the bonnet for ease in mounting and serves further to enhance the appearance of the completed assembly. As seen in FIG. 8, topped holes 70 and 71 are provided in the base for convencience in mounting in the event panel mounting is not feasible or desired.

The base 11 is provided with an inlet 21 and an outlet 22, the former of which extends into a bore 23 which is joined to enlarged bore 24 by shoulder 25. The junction of the shoulder is rounded slightly to form an apical zone 26 to provide a seat which co-operates with that of the stem. The enlarged bore 24 communicates with the outlet 22 adjacent the shoulder 25. A counterbored portion 27 is provided at the upper extremity of the base 11 for reasons to become apparent and is generally coaxial with the bores 23 and 24.

The bonnet 12 is provided with a central bore 28 which terminates in a frusto-conical shoulder 29 extending radially inward to a threaded bore 30. Bore 30 receives an actuator 31 which has co-operating threads 32. The actuator 31 has a cup-shaped end portion 32a having a rectangular or arcuate outer periphery 33 which terminates in a frusto-conical bottom portion 34 which in turn terminates at the stem of the actuator 31. The frusto-conical bottom portion 34 co-operates with the frusto-conical shoulder 29 in the bonnet to form a fluid tight joint when the stem is fully retracted, thereby to protect against leakage in case of bellows failure. The shoulder 29 also serves to limit the retraction of the stem to project against over extension of the bellows.

The stem portion of the actuator extends above the bonnet and is provided with a slot 35 to permit valve adjustment with a screw driver or the like as space requirements do not permit the use of a handle such as that shown at 36. Handle 36, when used, may be joined to the actuator through the use of one or more set screws 37 or the equivalent. As shown, the set screw 37 co-operates with a milled flat 38 on the actuator 31 to lock the handle in place. The cup-shaped portion 32a, with a rectangular or arcuate surface, is formed with an internal bore 40 which merges with a conical bottom portion 41.

A stainless steel valve stem 42 extends from the actuator 31 into the base 11. The upper end of the stem is of reduced diameter with respect to the remainder of the stem and terminates in a dome shaped or arcuate end portion 43 which engages the conical surface 41 at the base of the cup-shaped portion 32a. A groove 44 is provided adjacent the dome shaped end 41 and loosely receives a pin 53 carried by the actuator 31. The relationship of the co-operating element of the actuator and upper end of the stem will be described in greater detail when reference is made to FIGS. 3 and 5.

An integral flange 45 is provided on the stem adjacent the groove 44. A fluid impervious stainless steel bellows 46 is joined to the flange 45 while the opposite end of the bellows 46 is attached to a ring 47 which is clamped between the bonnet 12 and base 11. The method of connecting the bellows 46 to the flange and ring will be later described in detail.

The stem 42 is generally cylindrical in configuration as it extends from the flange 45 to the base 11. The diameter of the stem is slightly less than the inside diameter of the bellows 46 and only a few thousandths of an inch smaller than the enlarged bore 24 in the base 11, in order to provide good guiding of the stem during travel. As shown in FIGS. 2 and 4, a substantial portion of the lower end of the stem 42 is received in the enlarged bore 24. With this relationship, the stem 42 is guided in its reciprocation in the bore 24 over its full range of travel and thereby obviates any tendency of the stem to cock or bind. Generally desirable guiding characteristics are attained if the portion of the stem 42 which is guidedly received in bore 24 is at least equal to or greater than the diameter of stem 42. A milled flat 50 on the stem 42 extends from a relieved cylindrical portion 48 in the bore 24 to the bellows chamber. The flat 50 facilitates ingress and egress of fluids into the bellows chamber to assist in opening the valve, and further enhances the ease with which purging may be accomplished. It is obvious that any number of flats, keyways or the equivalent may be provided as long as they do not interfere with the guiding function of the lower part of the stem.

The lower end of the stem is provided with a frusto-conical seating surface 49 which co-operates with the apical zone 26 to effect desirable line seating, which tends to reduce the tendency of the stem and seat to stick together. The seat 49 merges with a second frusto-conical surface 51 having a greater included angle than the first. This construction permits full flow through the valve to be obtained with a reduced stroke. It also reduces turbulence during flow.

A fluid port 72 is provided in the bonnet 12 which extends from the reduced cylindrical portion 20 into the bore 30. Similarly a fluid port 73 extends through the lower portion of the bonnet nut 13 to a point adjacent the junction of the bonnet and base. The ports are provided to allow entry of a suitable test fluid when the valve is inspected under a vacuum after assembly. Due to the positioning of the ports, neither will impair the fluid tightness of the assembly when used in the field after testing. The use of ports permits finer quality control and inspection of the finished article.

Referring to FIGS. 2 through 5, the operation of the valve will be described. When the valve is in the closed position, as shown in FIG. 2, the conical bottom 41 in the actuator is engaged with the dome shaped end 43. As the handle 36 is rotated the conical bottom 41 initially assumes the position shown in dotted lines at 41 in FIG. 3. Simultaneously therewith, fluid pressure acting on the end of the stem opens the valve, and fluid may enter the bellows chamber. Thus, the fluid pressure acts on the end of the stem as well as the lower side of the flange 45 to force the stem upwardly. The force exerted by the pressure and spring constant of the bellows serves to keep the arcuate end 43 in engagement with the conical bottom 41. While the arcuate or dome shaped end is so engaged, the pin 53 is positioned centrally of the groove 44. In the event the valve should stick for any reason further movement of the actuator will move the pin 43 from the position shown at 53 to engage the sidewall of the groove 44 thereby exerting a light but positive lifting force on the stem. The dimension between the upper sidewall of the groove and the contacting portion 51 of the end 3 is of lesser order than that as measured from the upper side of the pin 3 to the contacting portion of the conical wall. This insures that the conical bottom 41 will engage the arcuate end only when the pin 3 is out of engagement with the sidewall of the groove 44.

The zones of contact 51 between the arcuate end 43 and the conical bottom 41 are located quite near the central axis of the stem so as to avoid an unduly great lever-like effect and thus reduce torsional strains at the bellows to an absolute minimum. The engagement of the arcuate surface 43 with the conical bottom wall 41 is such that it supports, centers and guides the upper end of the stem. The pin 3 is spaced from the bottom wall of the groove 44 so that it may float freely between the middle of the groove 44 and the upper sidewall.

The bellows may be attached to the flange 45 and ring 47 by fusion bonding. Since the method employed in attaching both ends of the bellows is similar, description will be limited to but one connection in the interests of brevity. As seen in FIG. 9, the bellows 46 is provided with axially extending portion 60 which is of appropriate diameter to closely receive the ring 47. The ring is provided with an axially facing trapezoidal groove 61. An electrical arc is passed through the bellows and ring in the presence of an inert gas such as helium, burning away the portions indicated in dotted lines at 62 and 63. As the burning progresses, the weld surface of the ring 47 increases to a point where the rate of the burning process is reduced, thereby preventing overheating of the bellows. The ring 47 may be fusion bonded into the counterbore 27, if desired, to provide a fluid tight connection with the base 11. The mass of the ring 47 and base 11 is such that overheating or annealing of the bellows is prevented.

A modified form of the invention is shown in FIG. 6. If a diverse material engagement at the seating portion is desirable, the relieved cylindrical portion 48 of the stem 42 may be omitted and a separable seat used. The lower end of the stem is provided with a bore 65 which receives a seat 66 with a press fit. The seat is illustrated as being plastic, such as Kel F, or the like; however, any suitable material (metal or non-metal) may be used. In order to accommodate replacement of the seat, the bonnet 12 and base 11 are held together only by the threaded engagement of the bonnet nut 13 with the base. A sealing ring 67 is interposed between the ring 47 and the bottom of the counterbore 25 to insure a fluid tight joint. The ring may be of metal or of plastic materials, and preferably can be of the same material as the removable seat 66.

The novel design of the instant valve allows the assembly steps to be performed with minimum effort while permitting a high degree of quality control and inspection to be exercised throughout the operation.

In assembling the valve of FIGS. 2 and 4, the stainless steel bellows 46 is inserted into the ring 47 with the last fold serving as a stop. The parts are joined by fusion bonding, preferably a heliarc welding process. The stem 42 is then inserted through the bellows until the periphery of the flange 45 is within the axially extending portion of the bellows and the last fold of the bellows engages the underside of the flange. The fusion bonding process is then repeated to join the bellows to the stem. The actuator 32 is then joined to the stem by aligning the groove and inserting the pin 53. Subsequently, the actuator is threaded into the bonnet through the bore 30. The bonnet, with the ring in engagement with the lower end thereof, is placed on the base 11. The ring 47 may be welded to the base around its periphery to insure fluid tightness if desired. Bonnet nut 13 is then tightened on the base to lock the base and bonnet together. Installation of the mounting nut 18 and handle 36 completes the assembly.

The assembly steps of the modified form shown in FIGS. 6 and 7 are the same as above up to and including attaching the bellows to the stem. Subsequent thereto, the removable seat is inserted in the stem, and a gasket 67 is placed in the counterbore 27 in the base 11 before the bonnet is joined thereto. After assembly, the valve is placed under a low vacuum in a helium leak detector, or similar testing device. The actuator is positioned so that it does not back seat and test fluid such as helium is introduced via the ports 72 and 73, under pressure. If any leakage should occur the valve is rejected; however, the steps of assembly are in such sequence that effective visual inspection at critical steps is possible, resulting in a very low number of rejects. It should be noted that the ports 72 and 73 are positioned so as to best serve the intended testing function, without the slightest impairment of the back seating feature which insures the fluid tightness of the chamber 28 housing the bellows.

It should be appreciated that the above described valve is exceedingly versatile. A wide variety of valves suitable for use over a wide range of conditions may be assembled requiring only minor changes such as the substitution of a stem, stem seat or the like. Accordingly, the valves may be mass produced for economy in manufacturing and only at assembly need the particular application of the valve be determined. This allows flexibility in inventory with a considerable reduction in the amount of parts to be kept on hand.

Referring now to FIGS. 10-12 wherein the second embodiment of the present invention is shown the valve comprises a body portion generally indicated at 80, having a bonnet portion 81 and base portion 82. As operating cap 83 is threadably received on the bonnet 81 by means of internal threads 84 in the cap 83 interfitting with the external threads 86 on the bonnet 81. The base portion 82 is provided with inlet and outlet portions 87 and 88 respectively. Suitable coupling means is provided to connect inlet and outlet lines thereto. While the fittings illustrated are of the swage-action variety, it is to be understood that male threads, female threads, and other suitable fittings may be utilized.

The fragmentary portion of the bulk head is shown at 89 having an aperture 91 through which the bonnet portion of the assembly is received. Suitable means, such as a bonnet nut 92, clamps the valve to the bulk head between the shoulder 93 on the bonnet and the nut 92. The root diameter of the threads 94 on the bonnet 81 is equal to or slightly greater than the crest of the threads 86 on the upper portion of the bonnet 81 to allow the bonnet nut 92 to be easily passed thereover when bulk head mounting is necessary or desirable.

Referring now more particularly to FIGS. 11 and 12, the bonnet 81 is provided with a central bore 96 which terminates in an inwardly projecting shoulder portion 97, forming a cylindrical end portion 98. A shoulder 99 merges with a cylindrical portion 101 of reduced diameter with respect to the end portion 98. The cylindrical portion 101 may be of a diameter equal to the crest diameter of the threads 94 for ease in manufacturing. The cylindrical end portion 98 is received in a bore 102 and the wall portions 103 are swaged to mechanically join the bonnet 81 and the body 80. By swage it is meant to encompass all methods of cold metal flow such as staking and the like.

A trough 104 formed in the counterbore 102 is filled with a low heat eutectic solder 106 which, due to capillary action, flows between the adjoining surfaces of the base and bonnet to form a fluidtight seal and increase the strength of the joint. The use of eutectic solder permits the use of low heat in the joining operation so that the previously formed joints and the threads 86 and 94 are unaffected thereby.

Two additional counterbores are provided coaxial with the counterbore 102, these being the counterbores 107 and 108 in the base portion 82. Inlet passage 87 communicates with counterbore 108, and, by means of the latter, with counterbore 107 and outlet passage 88. A shoulder 110 at the base of the counterbore 107 merges with the counterbore 108 through apical zone 109 to provide a seat which will hereinafter be described in greater detail. A stem 111 extends through the bore 96 in the bonnet and has an enlarged head or guiding portion 112 received in the counterbore 107. The enlarged head is relieved slightly as at 113, terminating in the frustoconical seating shoulder 114, which is of short axial length. Although exaggerated in the drawing, in practice the clearance of .001″ to .003″ is provided between the guide 112 and the counterbore 107. This has been found to be most desirable for easy axial travel of the stem while providing good lateral support and concentricity in seating. The guide surface 112 is interrupted, as indicated at 116, by a milled flat for the same reasons described in connection with the flat 50 on the stem of the valve of FIG. 1.

The guiding cylindrical portion 112 terminates in a shoulder portion 117 which is of greater diameter than the inside diameter 118 of the cylindrical portion 98, thereby providing a stop or limit for the upward travel of the stem to prevent over-extension of the bellows. The shoulder 117 terminates in the cylindrical portion 119 which flares outwardly as at 121 through the bellows chamber, terminating in a shoulder 122 which merges into a cylindrical extension 123. A rectangular groove 124 is provided in the cylindrical portion 123 adjacent a dome-shaped end 126. The dome-shaped end 126 is received in a conical recess 127 in the cap 83. This insures minimum contact between the stem and the cap portions with beneficial results in the centering and guiding of the stem, as well as reduction of heat transfer and torque transmission to the stem. Suitable anti-friction means, such as semi-solid silicone lubricant, may be provided in the conical recess 127 at assembly, which insures free, low friction, relative rotation between the dome 126 and the cap throughout the life of the valve.

A further beneficial result is derived from the use of a phenolic plastic in the construction of a cap 83. This further reduces the amount of torque when relative rotation occurs between the dome 126 and the bore 127. Additionally, in high temperature applications, the thermal conductivity of the plastic is approximately 480 times less than that of a metal, such as aluminum, so it may be operated under most circumstances by an unprotected hand.

The stem 111 is sealed to the valve body through the use of a bellows 128 which in this specific embodiment is composed of brass or the like. The lower fold 129 of the bellows terminates in an axially extending portion 130, which is of a diameter approximately equal to the inside diameter 118 of the cylindrical portion 98. The last fold 129 of the bellows 128 serves as a stop to limit the insertion of the bellows into the bore 96 prior to soldering. The axially extending portion 130 is fastened to the inside diameter 118 of the cylindrical portion 98 through the use of silver solder to provide a hermetically sealed, rigid joint. The upper fold 125 of the bellows similarly terminates in an axially extending portion 132 which is of a diameter slightly greater than the outside diameter of mounting ring 133. The inside diameter 134 of the ring 133 is of a diameter such as to provide a slip fit with the cylindrical extension 111 on the stem. In practice, the bellows 128 is fastened to the ring 133 and to the extension 123 by means of silver solder as at 135 and 136 providing a fluidtight joint. Ring 133 may be beveled at its outer periphery slightly in order to enhance the flow of solder during the soldering operation. Suitable spring means 137 bottoms on the shoulder 97 and the bore 96, with the opposite end engaging a backup washer 138 which is held in position by V-shaped clip washer 139 which may be inserted laterally into the groove 124, thereby facilitating rapid assembly. The spring 137 may be of any suitable type; however, in practice, stainless steel is preferred due to good operational characteristics under high temperature applications. Galvanic compatibility does not hamper the use of a stainless steel spring due to it being positioned externally of the bellows where it will not come into contact with the corrosive and high temperature fluids handled by the valve.

means rigid with said bonnet means spaced from said stem means and extending into said coaxial bore securing the other end of said bellows to prevent movement thereof;

actuating means movably supported on said bonnet means and including a substantially conical recess with the apex of said recess being in substantial alignment with the longitudinal axis of said central bore;

the other end of said stem means having a dome-shaped configuration disposed in said conical recess;

at least a portion of said stem means immediately adjacent said one end closely fitting with the walls of said bore in said base portion for guided movement therein whereby the combination of the cooperation between said stem portion and the walls of said bore together with the engagement of said stem means in said conical recess accurately positions said stem means in a substantially fixed position relative to the longitudinal axis of said bores in said valve;

said stem portion further including an interrupted peripheral portion extending axially of said stem means to allow fluid communication between the interior of said bellows and the fluid passage.

2. The combination of claim 1 wherein said means securing said upper end of said bellows to said stem means comprises a ring rigidly attached to said stem means;
said upper end of said bellows being secured to said ring by silver solder.

3. The combination of claim 1 wherein said spaced means comprises a shoulder extending into said central bore and providing with said bonnet means a heat sink;
said other end of said bellows being secured to said shoulder by silver solder.

4. The combination of claim 1 and including a counterbore adjacent to and coaxial with said first mentioned bore in said base portion;
a portion of said bonnet being received in said counterbore;
said portion of said bonnet being secured in said counterbored portion of said base by swaging and solder means.

5. The combination of claim 1 wherein said actuating means includes a portion thereof positioned in said bonnet means adjacent said other end of said stem means; and
means connecting said portion of said actuating means to said other end of said stem means whereby said actuating means may move longitudinally independently of said stem means over a predetermined range of movement.

6. The combination of claim 5 wherein said portion of said actuating means comprises a cup-shaped end portion receiving said dome-shaped end of said stem means therein;
said other end of said stem means further including groove defining means therein;
said connecting means including pin means carried by said cup-shaped end portion;
said pin means having a portion thereof positioned in said groove defining means.

7. The combination of claim 5 wherein said means connecting said actuating means to said stem means includes:
a cup-shaped end portion on said actuating means;
a conical recess at the bottom of said cup in opposed releationship to said dome-shaped configuration on said stem means;
groove defining means adjacent said other end of said stem means; and
pin means carried by said cup loosely received in said groove;
the axial dimension between the upper side of the groove and the apex of said dome-shaped configuration on said stem means being less than the axial dimension from the bottom of the conical recess to the upper side of said pin means and the axial dimension between the lower side of the groove and the apex of said dome-shaped configuration on said stem means being greater than the axial dimension from the bottom of the conical recess to the lower side of said pin means so that when said dome-shaped end of said stem means is engaged with the bottom of said conical recess, said pin means is spaced from the walls of said groove defining means.

8. A valve comprising:
a base portion having a fluid passage therethrough;
a bore in said base portion opening upwardly thereof and intersecting said fluid passage at its lower end;
a shoulder defining a valve seat at the intersection of the bore in the fluid passage;
bonnet means supported on said base portion having a central bore coaxial with said first mentioned bore;
stem means in said coaxial bore with one end thereof extending into the bore in said base portion;
a bellows in said coaxial bore surrounding at least a portion of said stem means;
means fluidtightly securing the upper end of said bellows to said stem means for movement therewith;
means rigid with said bonnet means spaced from said stem means and extending into said coaxial bore securing the other end of said bellows to prevent movement thereof;
actuating means movably supported on said bonnet means and having at least a portion thereof adjacent the other end of said stem means;
the adjacent portions of said actuating means and said stem means having a substantially conical recess in one of them and dome defining means carried by the other of them;
said conical recess having an apex in substantial alignment with the longitudinal axis of said cylindrical bore;
at least a portion of said stem means immediately adjacent said one end closely fitting with the walls of said bore in said base portion for guided movement therein whereby the combination of the cooperation between said stem portion and the walls of said bore together with the engagement of said dome defining means in said conical recess accurately positions said stem means in a substantially fixed position relative to the longitudinal axis of said bores in said valve;
said stem portion further including an interrupted peripheral portion extending axially of said stem means to allow fluid communication between the interior of said bellows and the fluid passage.

9. The combination of claim 8 wherein said other end of said stem means and said actuating means have groove defining means formed in one of them and connecting means carried by the other of them;
said connecting means being loosely received in said groove defining means and spaced from the walls thereof when said other end of said stem means is in engagement with said actuating means.

10. The combination of claim 8 wherein said bonnet means includes a second bore coaxial with said central bore;
said second bore having a diameter less than the diameter of said central bore;
said actuating means extending through said second bore into said central bore with a portion of said actuating means in said central bore having a diameter less than that of said central bore but greater than that of said second bore;
said portion of said actuating means including a radially extending surface in axially opposed relationship to the shoulder at the juncture of said central and second bores in said bonnet means so that in the full open position of said valve said radially extending surface will fluid-tightly engage said shoulder; and
leak test port means in said bonnet means communicating with said second bore at its inner end and with the atmosphere at its outer end.

In operation, rotation of the cap 83 less than one full turn will move the stem from closed, as shown in FIG. 11 to full open, as shown in FIG. 12. The movement of the stem 111 is linear, thereby preventing galling of the seats 114 and 109. Beneficial results have been obtained by fabricating the stem from aluminum silicon bronze with the body being composed of brass. These elements are galvanically compatible, while the stem is somewhat harder than the seat. Accordingly, after a few cycles of operation, brinnelling occurs in the apical zone 109 to provide fluidtight seating. A further advantage is found in providing an apical seat in the body portion, in that line contact seating is had with the frusto-conical portion 114 of the stem 111 reducing the possibilities of sticking. By virtue of the stem being of an enlarged frusto-conical design at the seat portion, only a slight axial retraction of the stem 111 is necessary in order to obtain full flow through the valve. In one concrete embodiment, the axial travel of the stem from full close to full open was .050". The short travel allows a shorter bellows to be used, reducing the overall area of bellows exposed to pressure as well as miniaturizing the overall assembly and reducing the initial cost. Alignment of the frusto-conical portion 114 with the seat 109 is enhanced by the guiding portion 112 being adjacent the seating portion. This insures that the stem will remain at all times coaxial with the bore 107, and consequently, the seat 109 precluding possibilities of misalignment. One or more flat portions 116 may be provided to facilitate equalization of the pressure on opposite ends of the guiding portion 112, minimizing undesirable piston effect in the valve. In the absence of flat portion 116, the stem would have to be moved against the force generated by pressure across the end of the stem since the tolerances between the guiding portions 112 and 107 are of low order. Moreover, the provision of the flat portion 116 allows fluids to enter the bellows chamber 140 when it becomes necessary or desirable to purge the valve.

The dead space of the valve is of extremely low order by virtue of the reduced length and diameter of the bellows 128. Further, the enlarged head adjacent the seat substantially occupies all the volume of the seat. The use of a miniature bellows and short stroke stem is one concrete embodiment resulted in a total dead space or internal volume being of the order of about .052 cubic inch.

The embodiment of the bellows valve described above has particular application in gas analysis and gas sampling systems. More generically, where absolute leak tightness is necessary, as is in the case with toxic or hazardous fluids, the bellows valve hereinbefore described is particularly applicable. Due to the unique construction of the above described valve, assembly is accomplished with ease. The bellows 128 is inserted into the bonnet portion with the last fold 129 providing a stop means on the shoulder 97. The bellows is then soldered to the bonnet portions with silver solder. Care is taken to prevent overheating which may injure the fragile bellows. The joint is preferably formed by placing a preformed solder ring between the bellows 130 and the shoulder 117. Controlled localized heat is then applied by an induction machine. The proportionate size of the cylindrical portion to the bellows serves as a thermal sink to absorb any excess heat, thereby protecting the bellows from annealing. The system is inserted through the bore 118 up through the bellows until the shoulder 117 engages the bottom of the cylindrical portion 98. The brass ring 133 is placed over the stem with the outer periphery of the ring nested within the axially extending portion 132 of the bellows. Silver solder and controlled localized heat are then applied, thereby fusing the bellows to the ring, and the ring to the stem. The ring and stem serve to dissipate the heat in order to protect the bellows during the induction welding process.

The bonnet and stem assembly is then inserted into the counterbore 102 and the bore 107, respectively, in the base 82. The wall portion 103 of the counterbore 102 is gently swaged inward to form a firm mechanical connection between the bonnet and the base. A low heat eutectic solder is melted by controlled heat methods into the trough 104 as heretofore explained, with capillary action causing it to flow between the interfitted parts to complete a fluidtight joint.

Due to the unique design and steps of assembling the bellows valve above described, it may be used in pressure and temperature environments heretofore impossible with known prior art devices. The short stroke of the stem on each cycle of operation materially reduces the possibilities of bellows fatigue, with the expected beneficial increase in the longevity of service.

The spring is then placed over the stem with the backup washer 138 compressing the spring downwardly to allow the lateral insertion of the clip washer 139. The cap 83 is then threadedly received on the bonnet and the assembly is complete. The valve may then be subjected to pressure tests to insure absolute leak tightness. Satisfactory tests have been performed by drawing a vacuum through the valve with a helium leak detector, while applying helium to the joints. Any leak even though small in magnitude will be detected, thus insuring exceedingly fine quality control over the finished product. To facilitate the introduction of helium to the chamber formed by the cap 83 and the bonnet 81, a fluid port 141 (FIG. 11) is placed in the cap 83, thus insuring that helium may be introduced around the bellows joints.

The term galvanically compatible as used in connection with this embodiment is intended to mean that the metals used in the working parts of the valve will not electrolytically deteriorate or corrode in the presence of electrolytic solutions such as acids, bases or salts. The term fusion is intended to encompass all processes of joining metals with the use of heat.

It is obvious that variations may be made in the illustrated embodiment without departing from the scope of the invention. For example, the side of the operating cap and/or pitch of the threads in the second embodiment may be varied to develop a greater mechanical advantage as desired. Additionally, the seating surfaces 113 and 114 could be coated with synthetic resinous compositions, such as Teflon, Kel F and the equivalent, if metal-to-metal seating is undesirable. An alternate to coating would include a plastic insert of the shape of the surfaces 113 and 114, which could be joined to the stem by a press fit, threads, set screw, or like construction. These are but a few of the departures which are envisioned as being encompassed by the present invention.

For ease of description, the principles of the invention have been set forth in connection with but two illustrated embodiments. It is not intended that the illustrated embodiments nor the technology employed in describing them is to be limiting in as much as variations in these may be made without departing from the scope and spirit of the invention. Rather, it is desired that any restriction on the invention be within the spirit and scope of the appended claims.

We claim:

1. A valve comprising a base portion having a fluid passage therethrough;
    a bore in said base portion opening upwardly thereof and intersecting said fluid passage at its lower end;
    a shoulder defining a valve seat at the intersection of the bore in the fluid passage;
    bonnet means supported on said base portion having a central bore coaxial with said first mentioned bore;
    stem means in said coaxial bore with one end thereof extending into the bore in said base portion;
    a bellows in said coaxial bore surrounding at least a portion of said stem means;
    means fluidtightly securing the upper end of said bellows to said stem means for movement therewith;

11. The combination of claim 8 wherein said rigid means comprises a ring supported on said base coaxial with said bore;

means securing the other end of said bellows to the inner periphery of said ring;

clamping means associated with said base portion and said bonnet means adapted to clamp said ring remote from the inner periphery thereof between said base portion and said bonnet means; and a port in said valve communicating with the juncture of said bonnet means, said base portion and said ring thereby to permit the introduction of leak test fluid thereto.

12. The combination of claim 8 wherein the tip of said one end of said stem means is removable;

said tip including a short tapering surface adapted to engage said seat;

said stem means being provided with a radially outwardly extending shoulder adjacent said tapering surface.

13. The combination of claim 8 wherein said valve includes means restraining the opening movement of said stem means beyond a predetermined point thereby to prevent overstressing of the bellows.

14. The combination of claim 8 wherein said recess is formed in actuating means and comprises first means adapted to engage said stem means when said stem means is moving in one direction; and second means on said actuating means adapted to engage said stem means when said stem means is travelling in either direction;

said first means being engageable with said stem means only when said second means is disengaged.

15. The combination of claim 8 wherein substantially all of said bellows is contained in said bonnet means so that when said actuator means is removed said bellows is shielded.

No references cited.

WILLIAM F. O'DEA, *Primary Examiner.*

A. COHAN, *Examiner.*